Figure 1:
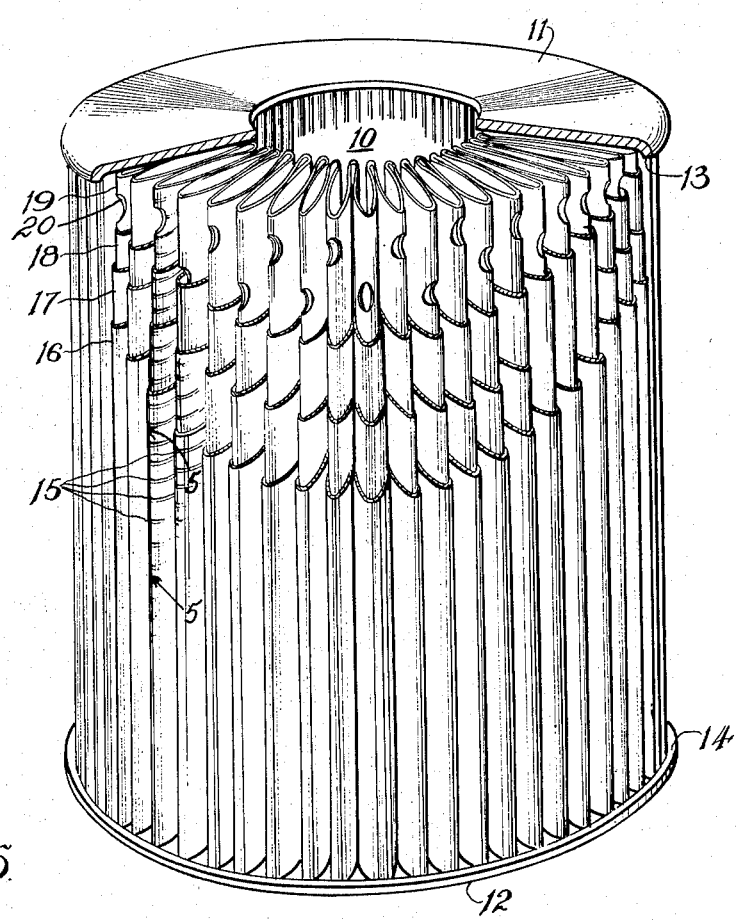

April 13, 1954 — R. R. LAYTE — 2,675,127
OIL FILTER ELEMENT CONSTRUCTION
Filed June 14, 1951 — 2 Sheets-Sheet 1

INVENTOR.
Ralph R. Layte.
BY
Kenyon & Kenyon
ATTORNEYS

April 13, 1954   R. R. LAYTE   2,675,127
OIL FILTER ELEMENT CONSTRUCTION
Filed June 14, 1951   2 Sheets-Sheet 2
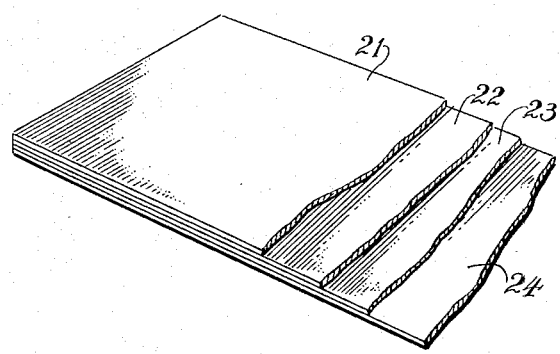
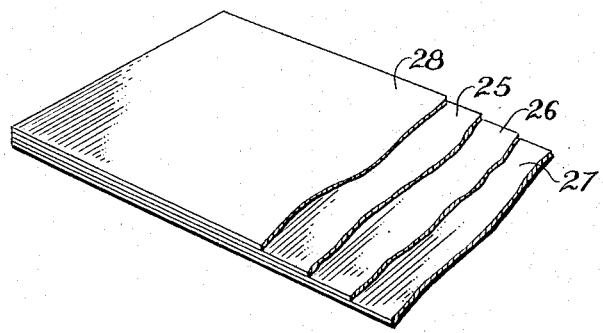
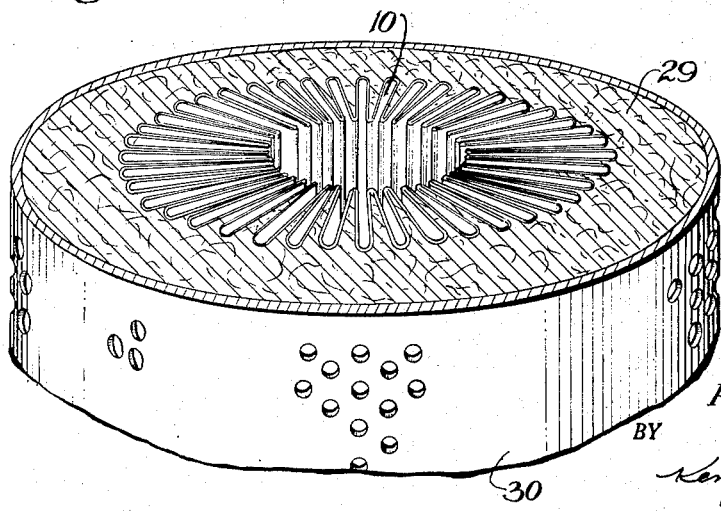
INVENTOR.
Ralph R. Layte.
BY
Kenyon & Kenyon
ATTORNEYS Patented Apr. 13, 1954

2,675,127

UNITED STATES PATENT OFFICE 2,675,127

OIL FILTER ELEMENT CONSTRUCTION

Ralph R. Layte, Westfield, N. J., assignor to Purolator Products, Inc., Rahway, N. J., a corporation of Delaware Application June 14, 1951, Serial No. 231,550

3 Claims. (Cl. 210—169)

It is the general object of this invention to provide filter element constructions having substantially increased useful life and which are rugged enough to stand up to normal usage, such as is experienced in motor car practice for example, while at the same time being structurally simplified to the point where they may be produced in quantity with greater rapidity and economy than are realized with present methods. This object is attained by the combination of one or more of the novel features hereinafter exemplified.

In accordance with one inventive feature, increased filter element life is obtained by use of a series of filter paper laminations or layers which become increasingly more dense (decreasingly porous) in the downstream direction of the fluid flow. The effect of this arrangement is that the largest particles are collected by the first or most porous (least dense) lamination, while the smallest particles are not collected until they reach the least porous (most dense) layer which is farthest downstream; intermediate particles are collected at intermediate layers having density or porosity corresponding to the size of the intermediate size particles. In short, the laminations in the series progressively retain finer and finer size particles. This principle of progressively filtering particles of progressively diminishing size results in substantially improved useful life for the filter element. For example, it has been found that a filter element laminated in this manner can be made to have a useful life from two to four times as long as a conventional filter element of the same size and geometry (same overall filter paper area) in which the filter paper has the same porosity throughout. Conversely, a filter element laminated in this manner can be made to perform the same job, i. e., to perform the same total amount of filtration, as a conventional filter element from two to four times larger (two to four times the filter paper area) but having the same useful life.

It is believed that the explanation of this improved performance is the following. Bearing in mind that useful life is measured by the clogging of the filter paper with filtered particles to the point where it begins to impede the normal fluid flow unduly, it is observed that a relatively dense (low porosity) filter paper is clogged more quickly when used to filter both the large particles and the small particles normally present in a fluid such as motor oil, whereas its useful life will be substantially longer if only small particles are present. Apparently, therefore, the improved life experienced with the use of the invention can be attributed to the fact that with the principle of the invention the large particles are precluded from the finer filter laminations and therefore are deprived of an opportunity to clog the finer laminations.

In accordance with another principle of the invention, certain of the filter laminations are treated with resin while others are not, the resin-treated layers being on the downstream side of the untreated ones. This has the effect that advantage can be taken of the better filtering action of untreated layers at the same time that their disadvantage of greater tendency to disintegrate in oil is avoided by the fact that the treated layers lend support which tends to prevent or minimize the disintegration. If desired, similar treated layers may back up the upstream side of such untreated layers in order to prevent disintegration if a momentary back flow in the oil should occur. The same principle may be used as a way of preventing asbestos fibers, which are very desirable as the filter material, from getting into the oil stream, i. e., resin-treated paper layers may be provided on either side of an asbestos filter layer to catch and retain the asbestos fibers.

In accordance with another feature, the metallic or other supports found necessary within the center of a pleated-annulus type of filter element are rendered unnecessary by the use of a perforated layer of mechanically strong paper as the last or downstream layer of the laminations.

In accordance with another feature of the invention, cotton or other fibrous materials are added to a pleated-annulus type of filter element under conditions which prevent the fibers from getting into the clean or downstream side of the oil flow.

Other features will be apparent from the description to follow. The whole invention will better be understood by reference to the following description of several illustrative embodiments thereof, which are also depicted in the annexed drawings.

Figure 5:
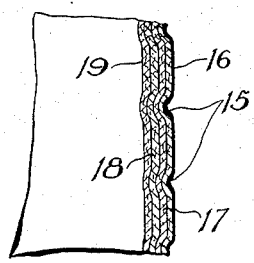

In the drawings:

The Figure 1 is a perspective view of a filter element constructed in accordance with the invention, Figure 5 being a magnified view of a section through the laminations in Figure 1;

The Figures 2 and 3 are alternative arrangements of the laminations useful in the Figure 1 type of construction;

While the Figure 4 is a partial perspective view of a filter element embodying another feature of the invention; and Figure 5 is a fragmentary vertical section taken along line 5—5 of Fig. 1.

Referring to the Figure 1, the filter element there shown comprises generally a pleated annulus 10 which is closed at its ends and held rigidly in position by the end caps 11 and 12, each having axially-extending peripheral flange sections 13 and 14 overlapping and containing the peripheral edges of the annulus 10. These caps 11 and 12 may be sealed to the ends of the annulus 10 by suitable sealing materials. The annulus 10 may be formed by stacking up its component laminations, hereinafter described, in parallel aligned strips, then pleating the entire stack in accordion- or bellows-like fashion with the pleatings extending transversely of the length of the strip. After this, the composite pleated strips comprising the successive laminations all meshed together as shown in the Figures 1 and 5 are rolled into the annulus 10 and the resulting juxtaposed ends of the strips are overlapped or sealed together in such manner as to present a completely closed annular structure. It is after this that the end caps 11 and 12 are added.

The pleating operation just described is preceded by the passage of the stacked laminations between opposed grooved rollers in a direction along the length of the strips so that the laminations have impressed in them a plurality of parallel grooves or serrations 15 which will extend generally in radial directions after the annulus 10 has been formed. These drainage grooves or serrations give somewhat more strength and area to the annulus 10. Besides, they tend to mesh the various laminations together to prevent relative motion.

As to the various laminations in the annulus 10, these may comprise a series of filter paper laminations 16, 17 and 18 of progressively increasing density (decreasing porosity) in the downstream direction of the fluid flow, and a somewhat stiffer supporting lamination 19. In the disclosed embodiment, the downstream direction is considered as being from the outside to the inside of the annulus, i. e., oil to be filtered flows through the laminations 16, 17, 18 and 19 in that order. If it be desired to use the reverse direction of flow (from inside to outside of annulus 10) the order of the laminations may be reversed. The supporting lamination 19 is primarily for the purpose of lending rigidity to the annulus so as to make unnecessary other types of mechanical supports within the annulus 10, such as the metal tubings now in current use. The paper of the lamination 19 is therefore of a type which is quite dense and strong. It is provided with a plurality of perforations or apertures 20 through which the oil may escape after its passage through the primary filtering laminations 16, 17 and 18. With this arrangement the annulus 10 can be made to be substantially self-supporting.

The laminations of the annulus 10 may be treated with resins of the kind and for the purpose disclosed in United States Letters Patent 2,103,572 to Donald H. Wells. Alternatively, selected members of the laminations may be so treated while others are left untreated for reasons explained below in connection with still another feature of the invention.

The laminated structure of the annulus 10, at least for that part of it made up of the primary filtering laminations 16, 17 and 18, may be formed of a plurality of separate and distinct sheets of filter paper as previously indicated. However, under certain conditions it may be preferable to form this part from a single integral sheet of paper which varies in density from one side to the other. Such an integral sheet can be fabricated by matting its portions or layers of different density together while still in the wet stage on a Fourdrinier machine and pressing them together to remove the moisture content. The use of an integral sheet of this character will facilitate the assembly of the filter unit.

In a practical filter constructed as shown in the Figure 1, very satisfactory results were obtained by using filtering papers of the following grades for the respective layers: for layer 16—20 to 25 microns; for layer 17—10 to 15 microns; for layer 18—2 to 5 microns and for perforated layer 19—5 to 10 microns. The micron values given here are a measure of porosity in terms of the width in microns of the average sized opening encountered by dirt particles which attempt to pass through the paper. The paper indicated for layer 19 was stiffer and stronger than those for the other layers; it was selected such that layer 19 could withstand a pressure of 70 to 100 pounds per square inch without collapsing.

In the Figure 2 there has been illustrated schematically another inventive feature which may be incorporated into structures of the kind illustrated in Figure 1 for the purpose of improving the filtering efficiency. The Figure 2 illustrates in the flat strip form prior to pleating a plurality of primary filtering laminations corresponding to the layers 16, 17 and 18 of the Figure 1 and an additional filtering lamination to be described. They may be used with or without an additional supporting layer of the kind illustrated by the layer 19 in the Figure 1.

The inventive thought behind the Figure 2 derives from the known fact that an untreated filter paper, i. e., untreated by resins (e. g., phenolic resins) as in the Wells patent previously mentioned, is more efficient or more absorptive than one which has been so treated. However, it has the disadvantage that it is more readily disintegrated or deteriorated by the fluid flow; mechanical disintegration of the fibers because of the fluid is a particularly troublesome aspect. However, this sort of mechanical disintegration of the paper with consequent loosening of the fibers and release of the fibers into the fluid stream can be prevented, or at least greatly minimized, by backing up the untreated layers with one which has been so treated. For example, referring to the Figure 2, the layers 21, 22 and 23 may correspond to layers 16, 17 and 18 of the Figure 1 and may be completely untreated paper subject to the disadvantageous disintegration just mentioned. They are arranged such that the downstream direction is from the layer 21 to the layer 23. These untreated layers may be supported by a layer 24 which has been treated with resins (e. g., phenolic resins) such as in the aforementioned Wells patent. Loosened fibers caused by any disintegration of the layers 21, 22 and 23 will be prevented from getting into the oil stream by the supporting action of the layer 24, which is not so subject to disintegration. It will be understood, of course, that treated layers of the kind illustrated by the layer 24 may be positioned elsewhere throughout a stacked plurality of untreated layers with the result that they will tend to minimize the adverse effects of any fiber disintegration on their upstream sides.

The same principle may be applied advantageously to permit the use of sheets made of asbestos fibers or combinations of asbestos fibers and cellulose fibers. It is understood that asbestos fibers are a particularly advantageous material for filtering purposes but they are disadvantageous because of their abrasive effects when they escape into the clean oil side of the flow and thus into engine parts. By using asbestos sheets in the place of the layers 21, 22 and 23 and then providing a treated backing layer 24, such destructive fibers of asbestos can be retained within the structure of the filter element so that they do not get into the engine parts.

It is to be understood, of course, that the flat laminated configuration illustrated by the Figure 2 may be fabricated in strip form and pleated and otherwise processed, as already described in connection with the Figure 1, so as to fashion the complete structure illustrated by the Figure 1.

The Figure 3 is a schematic figure similar to the Figure 2 and illustrates a similar principle. In this modification the layers 25 and 26 may be untreated primary filter laminations corresponding to the laminations 16, 17 and 18 of the Figure 1 and may be backed up on either side by treated layers 27 and 28 substantially the same in character as the layer 24 of Figure 2. The purpose of this is to provide backing on both the upstream and downstream sides of the primary filter laminations so that the advantageous results discussed in connection with the Figure 2 are obtained in either direction. This, for example, might prove quite desirable where momentary back surges of oil through the filter are expected.

In the inventive modification illustrated by the Figure 4, the construction includes in part a structure like that of Figure 1, but in addition a body of cotton or like absorbing filter medium is added around the annulus 10. It is understood that cotton constitutes a desirable filter material alone but it has the disadvantage that it tends to disintegrate locally so that the fluid becomes concentrated in channels and also cotton fibers are released and get into the oil stream. The construction of the Figure 4 overcomes this disadvantage and makes the use of cotton practical. In the Figure 4 the annulus 10 is substantially the same as the annulus 10 of the Figure 1. Surrounding it is an annular body of cotton 29, part of which is stuffed in between the upstream sides of the pleatings of the annulus 10, the upstream side as in the case of Figure 1 being considered to be the outer side. For retaining the body of cotton in position, a perforated outer container 30 of cardboard or other suitable material is provided. End caps (not shown) similar to caps 11 and 12 of Figure 1 may be added over container 30 and annulus 10. The cotton may be added by any suitable means, such as simple injection or by placing it, electrostatically or otherwise, on the paper of the annulus 10 prior to forming.

It will be understood that numerous modifications of the foregoing embodiments will occur to those skilled in the art without departing from the full scope and spirit of the invention.

What is claimed is:

1. A filter element for fluid comprising an annulus consisting of intermeshing pleated filter paper laminations having their pleating folds extending axially of the annulus, said laminations consisting of paper layers that progressively decrease in porosity in direction of flow for filtration of fluid through the filter element and an apertured support layer of relatively more rigid pleated paper intermeshed with the other paper layers and located adjacent the last of the laminations in said direction of flow, whereby in the flow of fluid through the laminations in the direction of said flow for filtration it will pass once only through each lamination.

2. A filter element for fluid comprising a pleated annular filter body with its pleat folds extending parallel with its annular axis, and with stretches of the pleats between folds extending substantially radially, said folds and stretches defining channels whose ends terminate at opposite ends of said body, and end discs secured to opposite ends of said body and closing off the ends of said channels, said body consisting of a plurality of juxtaposed layers of filtering paper of progressively decreasing porosity from the outside to the inside of the body and a final innermost apertured support layer that is stronger than any of the other layers, all of said layers being pleated together and in intermeshing relationship so that in the transit of fluid through the body from its outside to its inside, said fluid will pass once only and successively through the layers.

3. A filter element for fluid comprising a pleated annular filter body having its pleat folds extending parallel with its annular axis and its stretches between folds extending substantially radially, said folds and stretches defining outside channels and inside channels extending parallelly with said axis and whose ends terminate at opposite ends of said body, filter cotton surrounding the filter body and extending into its outside channels and a perforated container surrounding said cotton, said annular filter body consisting of a plurality of juxtaposed layers of filtering paper of progressively decreasing porosity from the outside toward the inside of the body and a final innermost apertured support layer of paper that is stiffer and stronger than any of the other layers, all of said layers being pleated together and in intermeshing relationship so that in the transit of fluid through the body from its outside to its inside, said fluid will pass once only and successively through the layers.

References Cited in the file of this patent

UNITED STATES PATENTS

| Number | Name | Date |
|---|---|---|
| 2,196,821 | Arnold | Apr. 9, 1940 |
| 2,279,423 | Vokes | Apr. 14, 1942 |
| 2,341,414 | Polivka | Feb. 8, 1944 |
| 2,349,469 | Sloan | May 23, 1944 |
| 2,386,684 | Hermanson | Oct. 9, 1945 |
| 2,433,531 | Ryan | Dec. 30, 1947 |
| 2,468,862 | Briggs | May 3, 1949 |
| 2,512,797 | Harvuot | June 27, 1950 |
| 2,537,897 | Hunter | Jan. 9, 1951 |
| 2,537,898 | Hunter et al. | Jan. 9, 1951 |
| 2,568,184 | Clark | Sept. 18, 1951 |